United States Patent
Theurer et al.

(10) Patent No.: US 6,762,390 B2
(45) Date of Patent: Jul. 13, 2004

(54) RAIL WELDING DEVICE

(75) Inventors: Josef Theurer, Vienna (AT); Leopold Gruber, Scheibbs (AT)

(73) Assignee: Franz Plasser Bahnbaumaschinen-Industriegesellschaft m.b.H., Vienna (AT)

(*) Notice: Subject to any disclaimer, the term of this patent is extended or adjusted under 35 U.S.C. 154(b) by 0 days.

(21) Appl. No.: 10/349,981

(22) Filed: Jan. 23, 2003

(65) Prior Publication Data

US 2003/0141283 A1 Jul. 31, 2003

(30) Foreign Application Priority Data

Jan. 28, 2002 (AT) .................................... GM 47/2002 U

(51) Int. Cl.[7] .......................... B23K 11/00; E01B 11/44
(52) U.S. Cl. .......................................... 219/53; 104/15
(58) Field of Search ............................. 219/53, 55, 97, 219/101; 104/15

(56) References Cited

U.S. PATENT DOCUMENTS

| | | | |
|---|---|---|---|
| 3,349,216 A | 10/1967 | Paton et al. ................ | 219/101 |
| 4,716,836 A | * 1/1988 | Hardt .......................... | 104/15 |
| 4,929,816 A | * 5/1990 | Theurer et al. ............... | 219/53 |
| 5,099,097 A | * 3/1992 | Theurer ....................... | 219/53 |
| 5,389,760 A | * 2/1995 | Zollinger .................... | 219/53 |

FOREIGN PATENT DOCUMENTS

| | | | |
|---|---|---|---|
| EP | 0 132 227 | 10/1986 | ........... E01B/29/46 |
| EP | 0 253 634 | 7/1987 | ........... E01B/29/46 |
| GB | 2 185 703 | 1/1986 | ........... B23K/11/02 |

\* cited by examiner

Primary Examiner—Kiley Stoner
Assistant Examiner—Kevin P. Kerns
(74) Attorney, Agent, or Firm—Collard & Roe, P.C.

(57) ABSTRACT

A rail welding device arranged for mobility along a track direction for effectuating the electric resistance welding of two track rails, comprising a control unit, and two halves of the device movable in the track direction, each half of the device being aligned with a respective one of the track rails and comprising a pair of clamping jaws pivotal towards and away from each other in a plane extending transversely to the track direction. Hydraulic cylinders move the two halves of the device in the track direction, and further hydraulic cylinders pivot the clamping jaws of each half away from each other between a set-up position in which the rail heads of the track rails may freely pass between the clamping jaws and a welding position in which the clamping jaws engage the rail webs. A sensing device detects the welding position at the end of the pivoting motion of the clamping jaws and sends control signals required to effectuate the electric resistance welding to the control unit.

6 Claims, 2 Drawing Sheets

Fig. 3
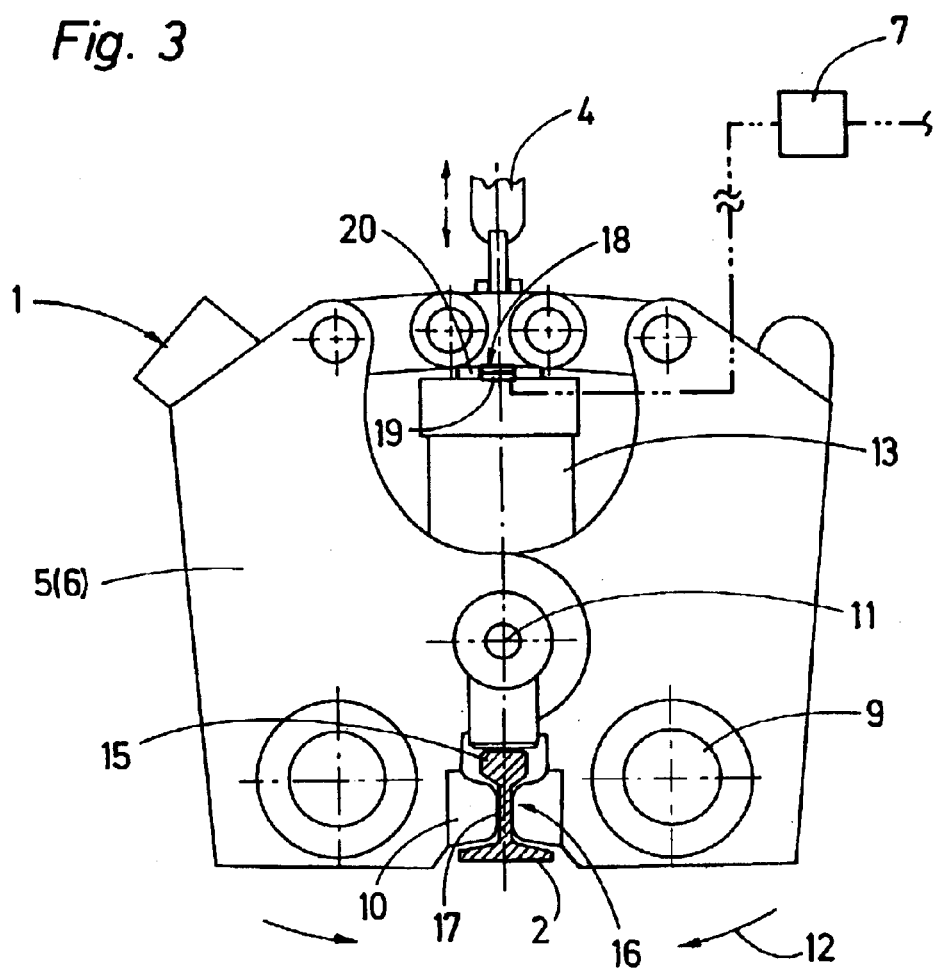
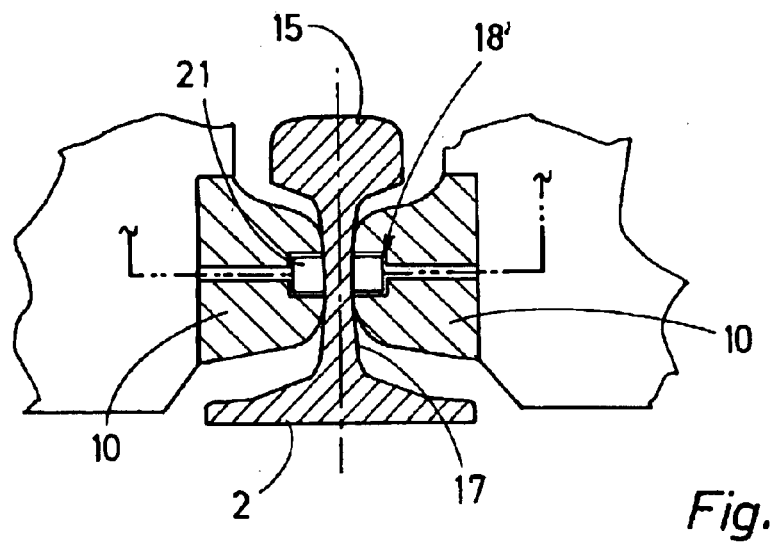
Fig. 4

RAIL WELDING DEVICE

BACKGROUND OF THE INVENTION

1. Field of the Invention

The present invention relates to a rail welding device arranged for mobility along a track direction for effectuating the electric resistance welding of two track rails each of which comprises a rail web and a rail head. The rail welding device comprises a control unit, and two halves of the device spaced from each other and movable in the track direction, each half of the device being aligned with a respective one of the track rails and comprising a pair of clamping jaws pivotal towards and away from each other in a plane extending transversely to the track direction. Hydraulic cylinder means is provided for moving the two halves of the device in the track direction, and further hydraulic cylinder means pivot the clamping jaws of each half away from each other between a set-up position in which the rail heads of the track rails may freely pass between the clamping jaws and a welding position in which the clamping jaws engage the rail webs. In this way, sections of both rails of the track may be welded together.

2. Description of the Prior Art

Such devices for electric resistance butt-welding of track rails are well known, as disclosed, for example, in U.S. Pat. No. 3,349,216, British patent No. 2,185,703 and European patent No. 0 132 227.

European patent No. 0 253 634 discloses a rail welding device wherein sensors are built into the clamping jaws for detecting whether the rail section ends to be welded together are accurately aligned with each other horizontally and vertically. The correction of any misalignment is automatically initiated by suitable control signals.

SUMMARY OF THE INVENTION

It is the primary object of this invention to provide a rail welding device of the first-described type, which permits the welding to proceed with a greater margin of safety and dependability.

The above and other objects are accomplished in such a device according to the invention with a sensing device for detecting the welding position at the end of the pivoting motion of the clamping jaws and sending control signals required to effectuate the electric resistance welding to the control unit.

This sensing device makes it possible to determine in a simple and dependable manner whether the clamping jaws actually firmly engage and truly lock the rail webs between them before the hydraulic cylinder means moving the halves of the rail welding device in the track direction transmit the relative large tension and compression forces to the track rails. Mere observation of the clamping pressure does not guarantee a secure seating of the clamping jaws on the rails since such a pressure is also present when, for instance, there is a metallic obstruction between the rail web and the clamping jaws. With welding proceeding only in dependence on a control signal which guarantees the exact engagement of the clamping jaws with the rail webs, damage to the welding head resulting from an oblique positioning of the clamping jaws relative to the rails is securely obviated.

BRIEF DESCRIPTION OF THE DRAWING

The above and other objects, advantages and features of the present invention will become more apparent from the following detailed description of certain now preferred embodiments thereof, taken in conjunction with the accompanying, somewhat schematic drawing wherein

FIGS. 2 and 3 show an end view of this rail welding device, seen in the track direction, in the set-up and welding position, respectively; and FIG. 4 is an enlarged fragmentary view showing another embodiment of the sensing device.

DETAILED DESCRIPTION OF THE PREFERRED EMBODIMENT

Figure 1:
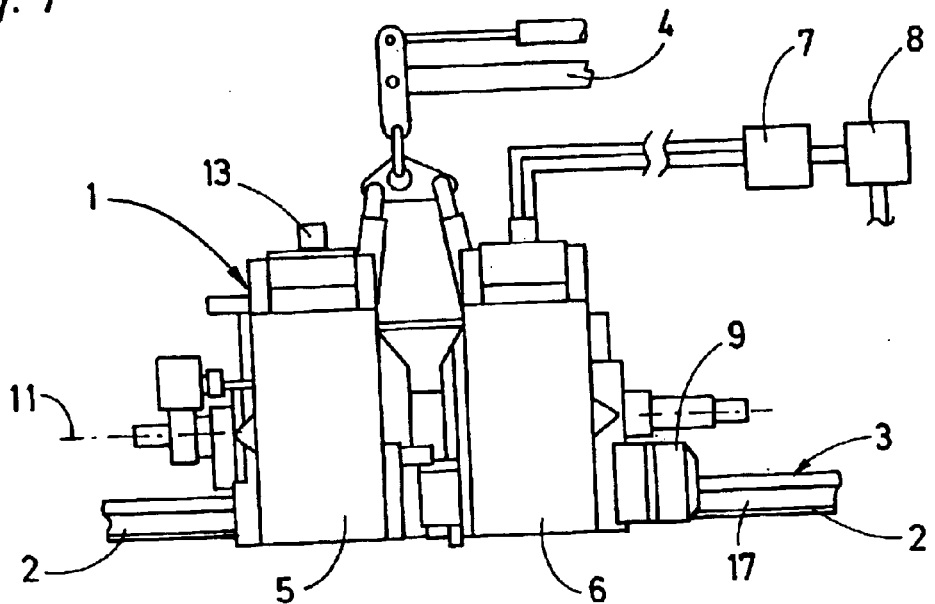
FIG. 1 is a simplified side view of a rail welding device according to this invention.

Referring now to the drawing and first to FIG. 1, there is shown rail welding device 1 arranged for mobility along a track direction for effectuating the electric resistance welding of track rails 2 each of which comprising rail web 17 and rail head 15. Rail welding device may be vertically and laterally adjustably loaded by crane 4 on a car (not shown), which is movable along track 3.

The rail welding device comprises control unit 7 arranged on the car, which is connected to generator 8 delivering electric current to the rail welding unit. Two halves 5, 6 of the device are spaced from each other and movable in the track direction, each half of the device being aligned with a respective one of track rails 2. Each rail welding device half 5, 6 comprises a pair of clamping jaws 10 are mounted rotatably on axle 11 extending in the track direction and are pivotal towards and away from each other in a swinging motion indicated by arrow 12 in a plane extending transversely to the track direction. Hydraulic cylinders 9 extend in the track direction and connect the rail welding device halves 5, 6 to each other for moving the two halves of the device in the track direction. Further hydraulic cylinder 13 is connected to clamping jaws 5, 6 for pivoting the clamping jaws of each half away from each other between a set-up position 14 (see FIG. 2) in which rail heads 15 of track rails 2 may freely pass between the clamping jaws and a welding position 16 (see FIG. 3) in which the clamping jaws engage rail webs 17 of the two track rails to be welded together.

Figure 2:
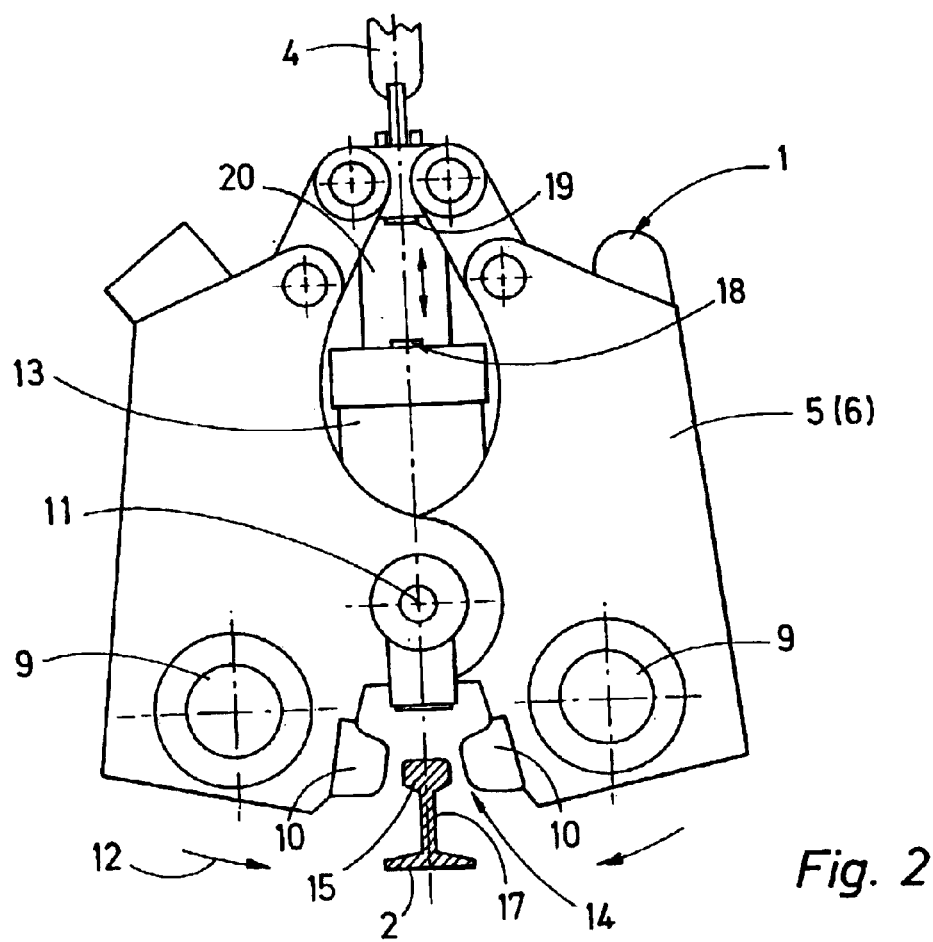

As shown in FIGS. 2 and 3, rail welding device 1 comprises a sensing device 18 for detecting welding position 16 at the end of the pivoting motion 12 of clamping jaws 10 and sending control signals required to effectuate the electric resistance welding to control unit 7. In this embodiment, the sensing device is a limit switch 19 connected to hydraulic cylinder 13 for detecting an end position of the pivotal clamping jaws, which defines welding position 16. Limit switch 19 is so adjusted that it generates the control signals only when piston 20 has fully entered hydraulic cylinder 13 to assume the position in which clamping jaws 10 firmly engage and lock rail web 17 therebetween. When control unit 7 receives the control signals emitted by sensing device 18 to start the welding procedure in which the two welding device halves 5, 6, together with the track rail ends gripped by the clamping jaws, are moved together and welded.

Such a sensing device dependably avoid any damage to the welding device. Such a damage could occur if the considerable tension forces are transmitted to the two track rail ends moved towards each other by hydraulic cylinders 9 even if the welding device is not accurately aligned with the track rails. In the operation of rail welding device 1, it may be useful to apply at first a low pressure of 80 bar which, for safety's sake, is increased to the final operating pressure of 120 bar only after the control signals are sent to control unit 7.

FIG. 4 illustrates another embodiment of a sensing device 18', which are sensors 21 incorporated in clamping jaws 10. Sensors 21 are so arranged and calibrated that they detect the position of the clamping jaws relative to rail webs 17 and emit the control signals when the correct clamping position has been reached.

Many other embodiments of sensing devices 18 may readily occur to those of ordinary skill in the art. For example, the sensing device may be an inductive displacement pickup which detects the pivoting movement of the clamping jaws towards each other or relative to a reference point. In this way, the correct position of the clamping jaws relative to rail web 17 can be determined, at which time the control signals are emitted. Other embodiments of the sensing device may be a contactless distance measuring gauge or a light barrier emitting the control signals upon interruption of the light beam when the clamping jaws are correctly positioned.

What we claim is:

1. A rail welding device arranged for mobility along a track direction for effectuating the electric resistance welding of two track rails each comprising a rail web and a rail head, comprising
    (a) a control unit,
    (b) two halves of the device movable in the track direction, each half of the device being aligned with a respective one of the track rails and comprising
        (1) a pair of clamping jaws pivotal towards and away from each other in a plane extending transversely to the track direction,
    (c) hydraulic cylinder means for moving the two halves of the device in the track direction,
    (d) further hydraulic cylinder means for pivoting the clamping jaws of each half away from each other between a set-up position in which the rail heads of the track rails may freely pass between the clamping jaws and a welding position in which the clamping jaws engage the rail webs, and
    (e) a sensing device for detecting the welding position at the end of the pivoting motion of the clamping jaws and sending control signals required to effectuate the electric resistance welding to the control unit.

2. The rail welding device of claim 1, wherein the sensing device is a limit switch for detecting an end position of the pivotal clamping jaws, which defines the welding position.

3. The rail welding device of claim 1, wherein the sensing device are sensors incorporated in the clamping jaws.

4. The rail welding device of claim 1, wherein the sensing device is a contactless distance measuring gauge.

5. The rail welding device of claim 1, wherein the sensing device is an inductive displacement pickup.

6. The rail welding device of claim 1, wherein the sensing device is a light barrier emitting the control signals upon interruption of the light beam.

* * * * *